US012756306B2

(12) United States Patent
Kumar et al.

(10) Patent No.: US 12,756,306 B2
(45) Date of Patent: Oct. 6, 2026

(54) DEVICE AND METHODS FOR DIGITAL SWITCHED CAPACITOR DC-DC CONVERTERS WITH REDUCED ANALOG CIRCUITRY

(71) Applicant: Microchip Technology Incorporated, Chandler, AZ (US)

(72) Inventors: Ajay Kumar, Phoenix, AZ (US); Paul Walker, Mission Viejo, CA (US); Ibiyemi Omole, Gilbert, AZ (US); Daniel Meacham, Del Mar, CA (US); Arvind Madan, Bangalore (IN); Santosh Patel, Bengaluru (IN)

(73) Assignee: Microchip Technology Incorporated, Chandler, AZ (US)

( * ) Notice: Subject to any disclaimer, the term of this patent is extended or adjusted under 35 U.S.C. 154(b) by 247 days.

(21) Appl. No.: 18/241,551

(22) Filed: Sep. 1, 2023

(65) Prior Publication Data

US 2024/0079955 A1 Mar. 7, 2024

(30) Foreign Application Priority Data

Sep. 2, 2022 (IN) ............................ 202211050276

(51) Int. Cl.
*H02M 3/07* (2006.01)
*H02M 1/00* (2006.01)

(52) U.S. Cl.
CPC ........... *H02M 3/07* (2013.01); *H02M 1/0012* (2021.05)

(58) Field of Classification Search
CPC ............................................... H02M 3/07–078
See application file for complete search history.

(56) References Cited

U.S. PATENT DOCUMENTS 6,055,168 A 4/2000 Kotowski et al. .............. 363/60
2014/0022684 A1* 1/2014 Jiang .................. H02M 3/1584 361/93.1

FOREIGN PATENT DOCUMENTS

KR 101390393 B1 4/2014 ............ H03L 7/093

OTHER PUBLICATIONS

A. Rao, W. McIntyre, Un-Ku Moon and G. C. Temes, "Noise-shaping techniques applied to switched-capacitor voltage regulators," in IEEE Journal of Solid-State Circuits, vol. 40, No. 2, pp. 422-429, Feb. 2005 (Year: 2005).*
International Search Report and Written Opinion, Application No. PCT/US2023/031888, 12 pages, Dec. 18, 2023.
Rao, Arun et al., "Noise-Shaping Techniques Applied to Switched Capacitor Voltage Regulators," IEEE Journal of Solid State Circuits, vol. 40, No. 2, pp. 422-429, Feb. 1, 2005.

* cited by examiner

*Primary Examiner* — Peter M Novak
(74) *Attorney, Agent, or Firm* — SLAYDEN GRUBERT BEARD PLLC

(57) ABSTRACT

A switched-capacitor DC-DC converter circuit may convert an input voltage into a desired output voltage level. A comparator may compare a desired voltage level to a divided version of the output voltage. A fully digital control circuit comprising a frequency divider circuit, a counter circuit, a digital control logic circuit and a gain selection circuit may generate a gain value, and a phase generator may convert the gain value into clock phase signals and control settings to control a switch array to select capacitors to produce a desired output voltage.

20 Claims, 5 Drawing Sheets

DEVICE AND METHODS FOR DIGITAL SWITCHED CAPACITOR DC-DC CONVERTERS WITH REDUCED ANALOG CIRCUITRY

PRIORITY

This application claims priority to commonly owned Indian Patent Application No. 202211050276 filed on Sep. 2, 2022, the entire contents of which are hereby incorporated by reference for all purposes.

FIELD OF THE INVENTION

The present disclosure relates to voltage regulation for electronic devices and, more particularly, to a switched capacitor Direct Current (DC)-DC voltage converter.

BACKGROUND

DC-DC voltage converters are utilized in many electronic applications to provide a regulated voltage supply to circuits in an electronic system.

In order to achieve high efficiency, a DC-DC converter may utilize an inductor. In an inductor-based DC-DC converter, the inductor may be located on-chip, integrated with the DC-DC converter circuitry, or may be located off chip. However, in some examples, it may not be possible to incorporate inductors on a same die as the rest of the converter, due to size, cost or technology limitations. In these examples, the inductor may be located off-chip and thus the DC-DC converter may need extra pins to interface with the inductor, thus adding to cost.

In some examples, a DC-DC converter may be implemented with capacitors, requiring no inductors. However, these examples suffer from poor efficiency.

There is a need for a DC-DC converter that can achieve high efficiency without the use of an inductor.

SUMMARY

The examples herein enable a system for a DC-DC converter which may achieve high efficiency without the use of an inductor and with a minimal amount of analog circuit blocks which may increase input power supply current and reduce efficiency.

According to one aspect, a switched-capacitor DC-DC converter device includes a switch array circuit to receive an input voltage, a plurality of clock phase signals and a plurality of control settings. The switch array circuit includes a plurality of switches coupled to a plurality of capacitors. A voltage divider to sense the output voltage may be coupled to the output of the switch array circuit. A first comparator may include a non-inverting input coupled to the output of the voltage divider and an inverting input coupled to a reference voltage. A divider circuit may include a first input coupled to the output of the first comparator and a second input coupled to an oscillator. A counter circuit may include an input coupled to the output of the divider circuit and the counter circuit may integrate the output of the divider circuit. A digital control logic circuit may be coupled to the output of the counter circuit. A gain selection circuit may be coupled to the output of the digital control logic circuit, the gain selection circuit may output a gain setting based on the output of the digital control logic circuit and based on the plurality of capacitors. A phase generator circuit may generate the plurality of clock phase signals and control settings based on the output of an AND gate and the output of the gain selection circuit. The AND gate may include a first input coupled to the oscillator and a second input coupled to the output of the comparator.

According to one aspect, a method includes the operations of: driving a comparator with a target voltage derived from an internal reference and a divided version of an output voltage, dividing the output of the comparator with an oscillator signal to generate a divider output, integrating the divider output with a counter circuit to generate a counter output, converting the counter circuit output to a gain setting, generating clock phase signals and control settings based on the gain setting, an oscillator signal and the output of the comparator, and driving a switch array circuit with the clock phase signals and control settings to generate the output voltage.

As such the system control is digital, the only analog control blocks being the comparator and the capacitor and switch array.

DETAILED DESCRIPTION

Figure 1:
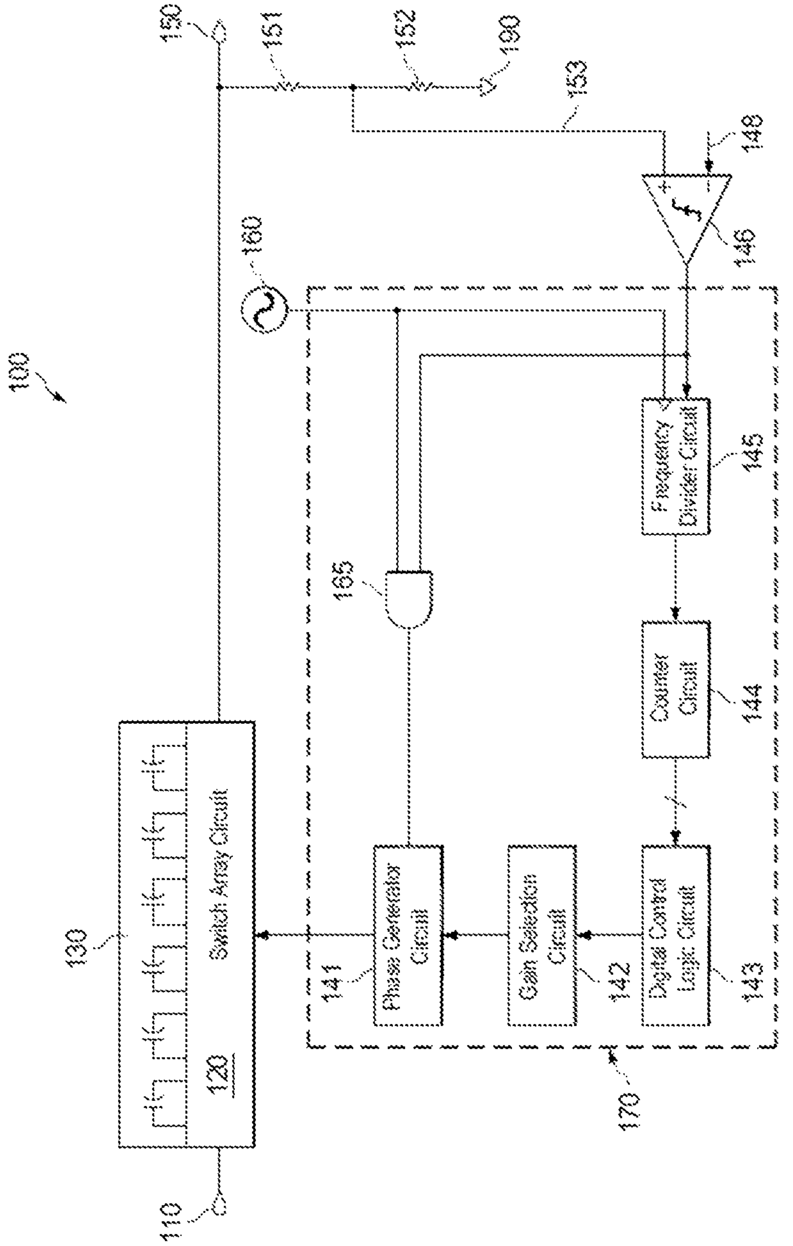
FIG. 1 illustrates one of various examples of a device for a switched capacitor DC-DC converter device.

FIG. 1 illustrates one of various examples of a DC-DC converter device 100 for converting an input voltage 110 to an output voltage 150.

DC-DC converter device 100 may include switch array circuit 120. Switch array circuit 120 may include capacitor array 130. In the example illustrated in FIG. 1, capacitor array 130 may include 6 capacitors, but this is not intended to be limiting. Capacitor array 130 may include a plurality of capacitors. The number of capacitors in capacitor array 130 may be more capacitors than the number of capacitors illustrated in FIG. 1, or may be fewer than the number of capacitors illustrated in FIG. 1.

Switch array circuit 120 may receive one or more input signals from phase generator circuit 141. The output of phase generator circuit 141 may include switch signals to control switches within switch array circuit 120. Switch signals from phase generator circuit 141 may set switch positions within switch array circuit 120 to produce a desired voltage at output voltage 150. Switch signals from phase generator circuit 141 may include clock phase signals and control settings to control switches within switch array circuit 120. Control settings may comprise one or more output digital control words.

Output voltage 150 may be coupled to a series connection of first resistor 151 and second resistor 152. A first node of second resistor 152 may be coupled to output reference voltage 153. A second node of second resistor 152 may be coupled to common potential node 190, which common potential may be ground. First resistor 151 and second resistor 152 may operate as a resistive voltage divider, to divide down output voltage 150 to produce output reference voltage 153. The example of FIG. 1 illustrates a resistive voltage divider, but this is not intended to be limiting. In other examples, a different divider circuit may produce output reference voltage 153.

Output reference voltage 153 may be input to the non-inverting input of comparator 146. The inverting input of comparator 146 may be coupled to target reference voltage 148. Target reference voltage 148 may be provided by a bandgap circuit, or may be provided by another circuit capable to produce a reference voltage.

The output of comparator 146 may be input to frequency divider circuit 145. The output of comparator 146 may be input to a first input of AND gate 165.

Oscillator 160 may be coupled to a second input of AND gate 165. Oscillator 160 may be coupled to a clock input of frequency divider circuit 145. Oscillator 160 may be a voltage-controlled oscillator, a current-controlled oscillator, a crystal oscillator or another type of oscillator not specifically mentioned.

The output of frequency divider circuit 145 may be coupled to counter circuit 144. The output of counter circuit 144 may increment or decrement based on the output of comparator 146 and corresponding output of frequency divider circuit 145. The output of counter circuit 144 may be coupled to digital control logic circuit 143. Digital control logic circuit 143 may utilize the increment/decrement output sequence of counter circuit 144 to provide input to gain selection circuit 142. Counter circuit 144 may function as an integrator in the digital domain.

In operation, digital control logic circuit 143 may detect two successive increments or decrements, respectively, in the output of counter circuit 144 and may provide output to gain selection circuit 142 to set switch array 120 to select capacitors in capacitor array 130 to produce, respectively, a higher or lower voltage gain. A continuous sequence of a single counter increment followed by a single decrement from counter circuit 144 may not be detected by digital control logic circuit 143 and may result in gain selection circuit 142 making no adjustment to switch array 120 which may produce no change in the voltage gain. In this way, capacitor array 130 may be configured by gain selection circuit 142 and switch array 120 such that output voltage 150 may attain a desired output level.

The output of gain selection circuit 142 may select a specific set of capacitors in capacitor array 130 based on the output of digital control logic circuit 143. Digital control logic circuit 143 and gain selection circuit 142 may select higher or lower voltage gain in capacitor array 130 by controlling switches in switch array 120 such that output reference voltage 153 may move closer to target reference voltage 148.

The output of gain selection circuit 142 may be input to phase generator circuit 141. Phase generator circuit 141 may select a voltage gain configuration in switch array 120 based on the output of gain selection circuit 142. Phase generator circuit 141 may also generate one or more clock phase signals from the output of AND gate 165 to control switching of switch array 120. The combination of the selected voltage gain configurations output from gain selection circuit 142 and the clock phase signals output from AND gate 165 may control capacitor array 130 to generate a specific voltage at output 150.

The circuits enclosed in 170 may be termed a control circuit.

Figure 2:
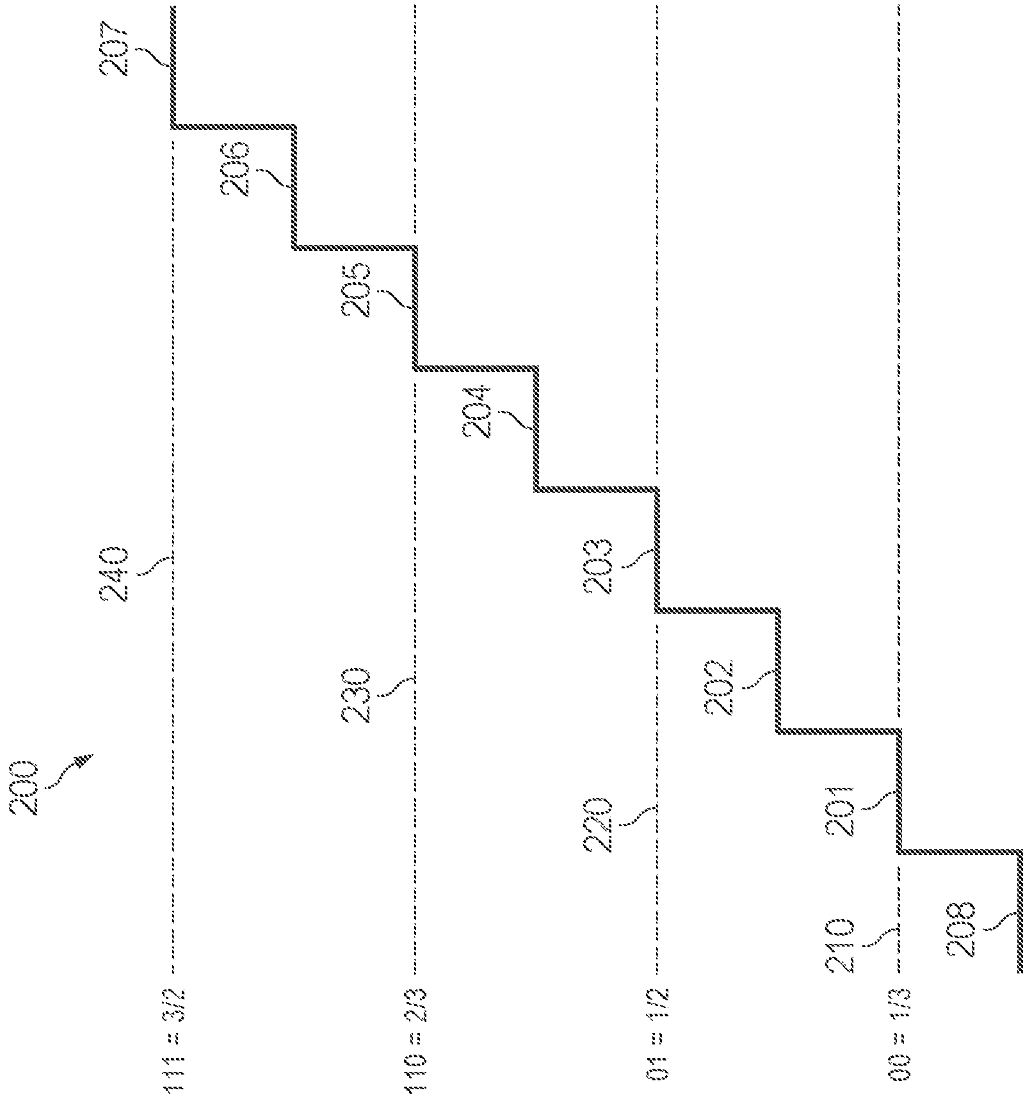
FIG. 2 illustrates one of various examples of the input/output relationship of a digital counter circuit and corresponding gain selection outputs.

FIG. 2 illustrates one of various examples of an input/output relationship of a digital counter circuit. FIG. 2 may represent the input/output relationship of counter circuit 144.

In operation, two successive increments or decrements in the output of counter circuit 144 may result in gain selection circuit 142 setting switch array 120 to select capacitors in capacitor array 130 to produce a higher or lower voltage gain. A continuous sequence of a single counter increment followed by a single decrement from counter circuit 144 may result in gain selection circuit 142 making no adjustment to switch array 120 which may produce no change in the voltage gain. In this way the capacitor array 130 may be configured by gain selection circuit 142 and switch array 120 such that output voltage 150 may attain a desired output level.

In operation, at an input value of zero, illustrated at 208, and at an input value of one, illustrated at 201, counter circuit 144 may instruct gain selection circuit 142 to select capacitors to produce a ⅓ gain level. Inputs equal to or below level 210 may produce a ⅓ gain level. As counter circuit 144 continues to increment, at an input value of two, illustrated at 202, and at an input value of three, illustrated at 203, counter circuit 144 may instruct gain selection circuit 142 to select capacitors to produce a ½ gain level. Inputs equal to or below level 220 and above level 210 may produce a ½ gain level. As counter circuit 144 continues to increment, at an input value of four, illustrated at 204, and at an input value of five, illustrated at 205, counter circuit 144 may instruct gain selection circuit 142 to select capacitors to produce a ⅔ gain level. Inputs equal to or below level 230 and above level 220 may produce a ⅔ gain level. As counter circuit 144 continues to increment, at an input value of six, illustrated at 206, and at an input value of seven, illustrated at 207, counter circuit 144 may instruct gain selection circuit 142 to select capacitors to produce a 3/2 gain level. Inputs equal to or below level 240 and above level 230 may produce a 3/2 gain level.

Figure 3:
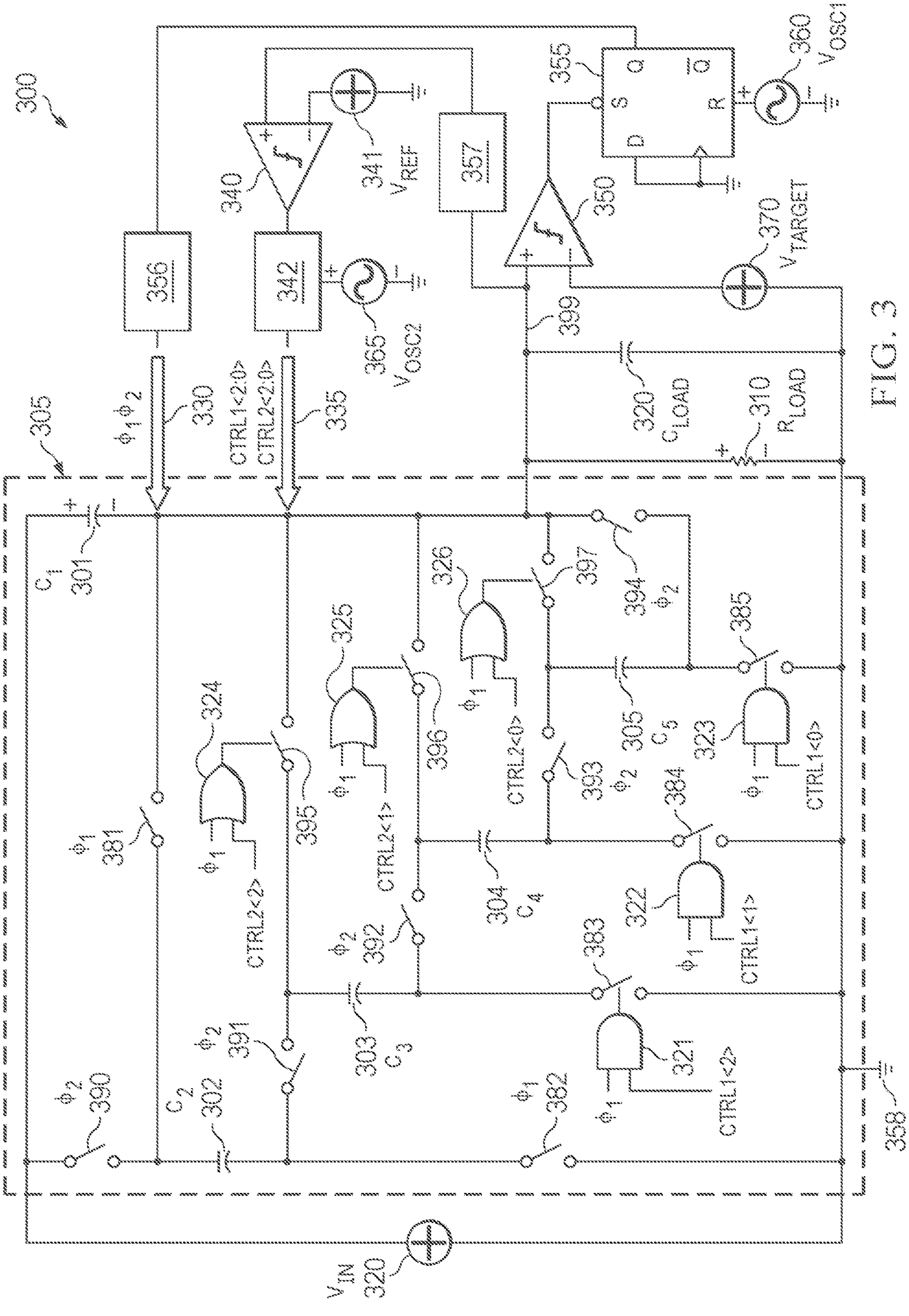
FIG. 3 illustrates one of various examples of a switched capacitor DC-DC converter with multiple voltage gain configurations.

FIG. 3 illustrates one of various examples of a switched capacitor DC-DC converter device 300 with multiple voltage gain configurations. Switches illustrated in FIG. 3 may be configured to produce one of a plurality of voltage gains from input voltage 320 to the voltage at output node 399.

Circuit 305 may comprise a combination of switch array circuit 120 and capacitor array 130 as described in reference to FIG. 1. Clock phase signals 330 and control settings 335 may be input to circuit 305.

Input voltage 320 may be input to the DC-DC converter device 300. Output node 399 may be coupled to load resistor 310 and to load capacitor 320, which load resistor 310 and load capacitor 320 are coupled in parallel between output node 399 and the common potential 358.

Reference voltage 341 may be input to an inverting input of first comparator 340. Output node 399 may be coupled to voltage divider 357. The output of voltage divider 357 may be input to a non-inverting input of first comparator 340.

Output node 399 may be coupled to a non-inverting input of second comparator 350. Target voltage 370 may represent a desired output voltage at output node 399. Target voltage 370 may be input to an inverting input of second comparator 350.

DC-DC converter device 300 may include capacitors 301, 302, 303, 304 and 305. DC-DC converter device 300 may include a set of first phase switches 381 and 382. First phase switches 381 and 382 may be driven by a first phase clock signal, denoted $\phi_1$. DC-DC converter device 300 may include a set of second phase switches 390, 391, 392, 393 and 394. Second phase switches 390, 391, 392, 393 and 394 may be driven by a second phase clock signal, denoted $\phi_2$.

AND gate 321 may drive switch 383. AND gate 322 may drive switch 384. AND gate 323 may drive switch 385. OR gate 324 may drive switch 395. OR gate 325 may drive switch 396. OR gate 326 may drive switch 397.

Logic circuit 342 may illustrate one of various examples of control circuit 170, as described in reference to FIG. 1. Logic circuit 342 may generate first output digital control word CTRL1<2:0> and second output digital control word CTRL2<2:0>. First comparator 340 may produce an output based on an output of voltage divider 357 and based on reference voltage 341. Logic circuit 342 may generate first output digital control word CTRL1<2:0> and second output digital control word CTRL2<2:0> based on the output of first comparator 340 and based on second oscillator 365. First output digital control word CTRL1<2:0> and second output digital control word CTRL2<2:0> may be operative to produce a switch configuration which provides a specific voltage converter gain from input voltage 320 to the voltage at output node 399. Bit<2> of first output digital control word CTRL1<2:0> may drive a first input of AND gate 321. Bit<1> of first output digital control word CTRL1<2:0> may drive a first input of AND gate 322. Bit<0> of first output digital control word CTRL1<2:0> may drive a first input of AND gate 323. In a similar manner, bit<2> of second output digital control word CTRL2<2:0> may drive a first input of OR gate 324. Bit<1> of second output digital control word CTRL2<2:0> may drive a first input of OR gate 325. Bit<0> of second output digital control word CTRL2<2:0> may drive a first input of OR gate 326.

Non-overlapping clock generator 356 may generate first phase clock signal $\phi_1$ and second phase clock signal $\phi_2$. Non-overlapping clock generator 356 may be integrated into logic circuit 342, or may be a separate component. Memory circuit 355 may be coupled to non-overlapping clock generator 356. In the example illustrated in FIG. 3, memory circuit 355 may be implemented as a D-latch, but this is not intended to be limiting.

In operation, when second comparator 350 outputs a logic low level, memory circuit 355 may be set to a logic high level because the output of second comparator 350 is coupled to the set input of memory circuit 355, which is an active low input. When first oscillator 360, which is coupled to the reset input of memory circuit 355, outputs a logic high level, memory circuit 355 may be set to a logic low level. Memory circuit 355 is illustrated as a Set-Reset memory circuit, implemented as a D-Latch, or Flip-Flop circuit, with the clock input and D input coupled to the common potential 358, but this is not intended to be limiting. Memory circuit 355 may be a latch or may be another type of memory circuit not specifically mentioned.

When output node 399 drops below target voltage 370, memory circuit 355 may be set by the output of second comparator 350. Capacitors in DC-DC converter device 300 may be set to the charging phase, defined as first phase clock signal $\phi_1$ asserted. When output node 399 rises above target voltage 370, the capacitors in DC-DC converter device 300 may be set to the discharging phase, defined as second phase clock signal $\phi_2$ asserted. When first oscillator 360 is de-asserted, output node 399 may droop due to load resistor 310. The set input of memory circuit 355 may be dominant over the reset input of memory circuit 355.

In operation, DC-DC converter device 300 may convert input voltage 320 to output voltage Vout at output node 399, and may operate to drive to output voltage Vout towards target voltage 370. Second comparator 350 may generate an output based on the relationship between output voltage Vout at output node 399 and target voltage 370. The output of second comparator 350 may drive a set input of memory circuit 355. Memory circuit 355 may output a signal at the Q-output of memory circuit 355. The Q-output of memory circuit 355 may be input to non-overlapping clock generator 356. Non-overlapping clock generator 356 may output first phase clock signal $\phi_1$ and the second phase clock signal $\phi_2$. First phase clock signal $\phi_1$ may drive AND gates 321, 322, and 323, and may drive switches 381 and 382. Second phase clock signal may drive OR gates 324, 325 and 326, and may drive switches 390, 391, 392, 393 and 394. First comparator 340 may generate an output based on the relationship between reference voltage 341 and output voltage Vout at output node 399. Logic circuit 342 may generate first output digital control word CTRL1<2:0> and second output digital control word CTRL2<2:0> based on the output of first comparator 340 and second oscillator 365. First output digital control word CTRL1<2:0>, second output digital control word CTRL2<2:0>, first phase clock signal $\phi_1$ and the second phase clock signal $\phi_2$ may produce a particular switch configuration to produce a particular output voltage Vout at output node 399. In this manner, DC-DC converter circuit 300 may drive output voltage Vout at output node 399 towards target voltage 370.

Other examples of DC-DC converter device 300 may include a different number of capacitors, switches AND gates and OR gates than illustrated in FIG. 3.

Figure 4:
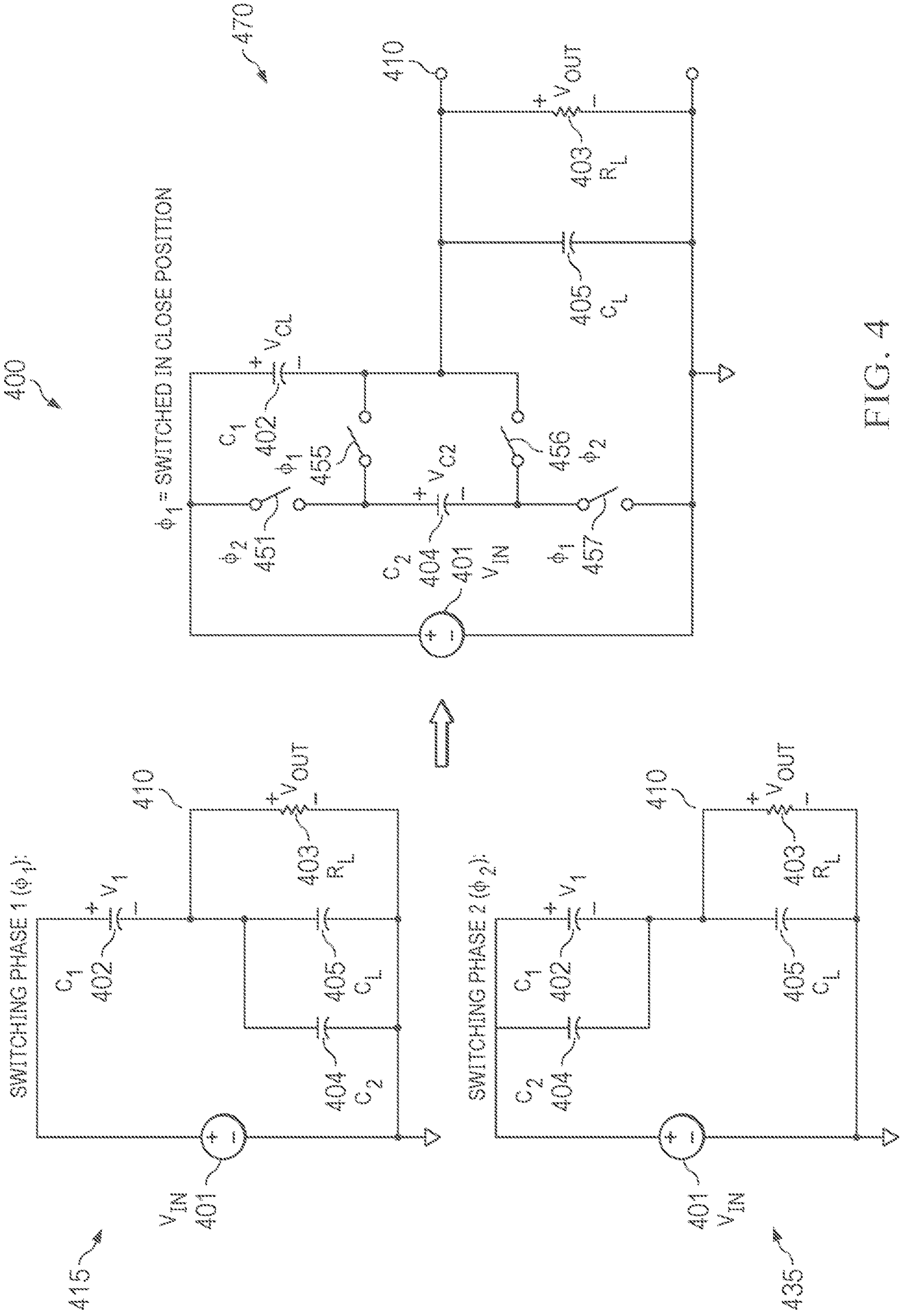
FIG. 4 illustrates an example of a switched capacitor DC-DC converter with a single gain voltage configuration and the equivalent circuits at the $\phi_1$ and $\phi_2$ switch array positions.

FIG. 4 illustrates an example of a switched capacitor DC-DC converter 470 with a single gain voltage configuration. Switch configuration 415 may illustrate the equivalent circuit with the first phase clock signal $\phi_1$ asserted. Switch configuration 435 may illustrate the equivalent circuit with the second phase clock signal $\phi_2$ asserted. DC-DC converter 470 may be an example of DC-DC converter device 300 where first output digital control word CTRL1<2:0>=<000> and second digital output control word CTRL2<2:0>=<000>.

Switch configuration 415 may illustrate switch array circuit 300 with the first phase clock signal $\phi_1$ asserted, or may represent another switch array circuit with the first phase clock signal $\phi_1$ asserted.

First phase clock signal $\phi_1$ and second phase clock signal $\phi_2$ may be generated by a non-overlapping clock generator, such that no more than one of first phase clock signal $\phi_1$ and second phase clock signal $\phi_2$ may be asserted at any time.

Input voltage 401 may be input in switch configuration 415 to first capacitor 402. For the case illustrated in FIG. 4, where first output digital control word CTRL1<2:0>=<000> and second output digital control word CTRL2<2:0>=<000> (as illustrated and described in reference to FIG. 3), first capacitor 402 may be in series with a parallel combination of second capacitor 404, load capacitor 405, and load resistor 403.

Switch configuration 415 is illustrated with first capacitor 402 and second capacitor 404, but this is not intended to be limiting. When the first phase clock signal $\phi_1$ is asserted, more capacitors (as illustrated and described in FIG. 3 in reference to switch array circuit 300) may be connected in switch configuration 415 based on alternative settings of first output digital control word CTRL1<2:0> and second output digital control word CTRL2<2:0>.

Switch configuration 435 may illustrate switch array circuit 300 with the second phase clock signal $\phi_2$ asserted and first phase clock signal $\phi_1$ de-asserted. Switch configuration 435 may illustrate switch array circuit 300 with the second phase clock signal $\phi_2$ asserted or may represent another switch array circuit with the second phase clock signal $\phi_2$ asserted.

For the example illustrated in FIG. 4 with first output digital control word CTRL1<2:0>=<000> and second output digital control word CTRL2<2:0>=<000> (as described and illustrated in reference to FIG. 3), input voltage 401 may be input in switch configuration 435 to a parallel combination of first capacitor 402 and second capacitor 404. The parallel combination of first capacitor 402 and second capacitor 404 may be in series with a parallel combination of load capacitor 405 and load resistor 403.

Switch configuration 435 is illustrated with first capacitor 402 and second capacitor 404, but this is not intended to be limiting. When the second phase clock signal $\phi_2$ is asserted, more capacitors (as illustrated and described in FIG. 3 in reference to switch array circuit 300) may be connected in switch configuration 435 based on alternative settings of first output digital control word CTRL1<2:0> and second output digital control word CTRL2<2:0>.

Switch configuration 470 may illustrate the combination of switch configuration 415 and switch configuration 435 for the example illustrated in FIG. 4 with first output digital control word CTRL1<2:0>=<000> and second output digital control word CTRL2<2:0>=<000>. In operation, when the first phase clock signal $\phi_1$ is asserted, switch 455 and switch 457 may be closed, and switch 451 and switch 456 may be opened. The circuit configuration may match switch configuration 415. When the second phase clock signal $\phi_2$ is asserted, switch 455 and switch 457 may be closed, and switch 451 and switch 456 may be opened. The circuit configuration may match switch configuration 435.

Figure 5:
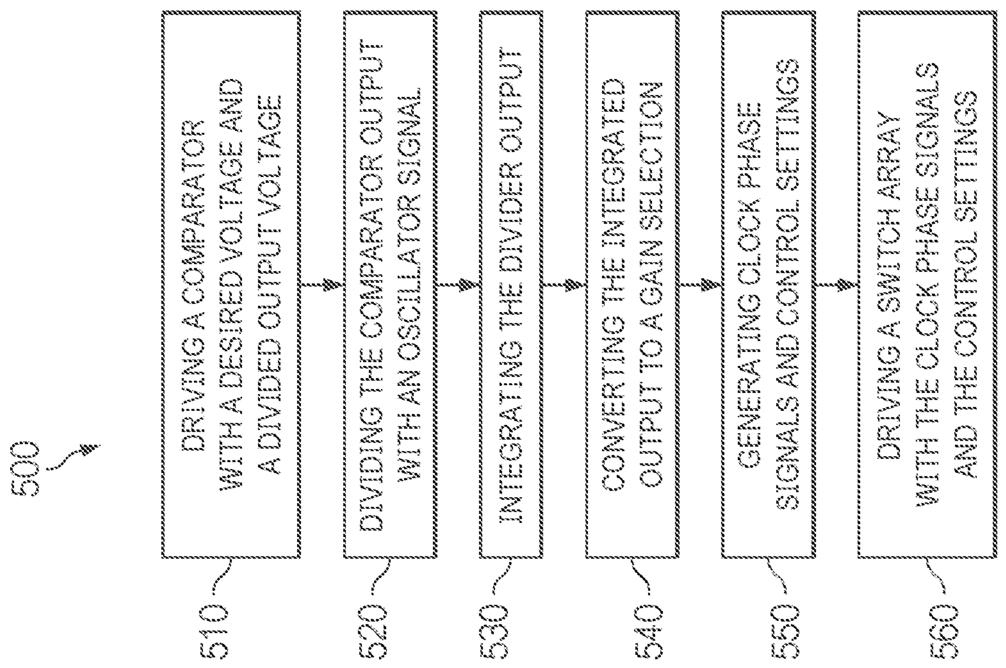
FIG. 5 illustrates a method of switched capacitor DC-DC conversion.

FIG. 5 illustrates a method of switched capacitor DC-DC conversion.

At operation 510, a comparator may be driven with a desired voltage and a divided output voltage. The divided output voltage may be generated by a resistive voltage divider, or by another frequency divider circuit.

At operation 520, the comparator output may be divided by an oscillator signal.

At operation 530, the divider output may be integrated. In one of various examples, the integration may be performed by a counter circuit.

At operation 540, the counter circuit output may be converted to a gain selection.

At operation 550, circuits may generate clock phase signals and control settings. The clock phase signals may comprise a first phase clock signal $\phi_1$ and a second phase clock signal $\phi_2$ The control settings may comprise output digital control words.

At operation 560, clock phase signal and control settings may drive a switch array, the switch array to select one or more capacitors to produce a desired voltage gain at an output.

The invention claimed is:

1. A DC-DC converter device comprising:

a switch array circuit to receive an input voltage, a plurality of clock phase signals and a plurality of control settings, the switch array circuit comprising a plurality of switches coupled to a plurality of capacitors;

a voltage divider coupled to the output of the switch array circuit;

a first comparator with a non-inverting input coupled to the output of the voltage divider, and an inverting input coupled to a reference voltage;

a frequency divider circuit with a first input coupled to the output of the first comparator and a second input coupled to an oscillator;

a counter circuit with an input coupled to the output of the frequency divider circuit, the counter circuit to integrate the output of the frequency divider circuit;

a digital control logic circuit coupled to the output of the counter circuit;

a gain selection circuit coupled to the output of the digital control logic circuit, the gain selection circuit to output a gain setting based on the output of the digital control logic circuit and based on the plurality of capacitors;

a second comparator with an inverting input coupled to a target voltage and non-inverting input coupled to the output voltage, the output of the second comparator coupled to the memory circuit, and a phase generator circuit to generate the plurality of clock phase signals and control settings based on the output of an AND gate and the output of the gain selection circuit, the AND gate comprising a first input coupled to the oscillator and a second input coupled to the output of the comparator, wherein the phase generator circuit comprising a set-reset memory circuit coupled to a non-overlapping clock generator.

2. The device as claimed in claim 1, the frequency divider circuit comprising a digital frequency divider circuit.

3. The device as claimed in claim 1, the counter circuit comprising a digital counter circuit.

4. The device as claimed in claim 1, the gain selection circuit comprising a digital gain selection circuit.

5. The device as claimed in claim 1, the phase generator circuit comprising a digital phase generator circuit.

6. The device as claimed in claim 1, the switch array circuit comprising at least one logic gate with a first input coupled to one of the plurality of clock phase signals and a second input coupled to one of the plurality of control settings, the logic gate output to drive at least one of the plurality of switches.

7. The device as claimed in claim 1, the digital control logic circuit to convert a 3-bit input into one of four output settings.

8. The device as claimed in claim 1, the clock phase signals comprising a first clock phase signal and a second clock phase signal.

9. The device as claimed in claim 1, the control settings comprising output digital control words.

10. The device as claimed in claim 1, the voltage divider comprising a resistive voltage divider.

11. A method comprising:

driving a comparator with a desired output voltage and a divided version of an output voltage;

dividing the output of the comparator with an oscillator signal to generate a divider output;

integrating the divider output with a counter circuit to generate a counter output;

converting the counter circuit output to a gain setting;

generating clock phase signals and control settings based on the gain setting, an oscillator signal and the output of the comparator, the clock phase signals to be generated by a phase generator circuit comprising a set-reset memory circuit coupled to a non-overlapping clock generator; and driving a switch array circuit with the clock phase signals and control settings to generate the output voltage, the method further comprising a second comparator with an inverting input coupled to a target voltage and non-inverting input coupled to the output voltage, the output of the second comparator coupled to the memory circuit.

12. The method as claimed in claim 11, the counter circuit comprising a digital counter circuit.

13. The method as claimed in claim 11, the gain setting comprising a digital gain setting.

14. The method as claimed in claim 11, the switch array circuit comprising a plurality of switches coupled to a plurality of capacitors.

15. The method as claimed in claim 11, the switch array circuit comprising at least one logic gate with a first input coupled to one of the clock phase signals and a second input coupled to one of the control settings, the logic gate output to drive at least one of the plurality of switches.

16. The method as claimed in claim 11, the converting the counter circuit output comprising selecting a number of capacitors from the plurality of capacitors in the switch array circuit.

17. The method as claimed in claim 11, the clock phase signals comprising a first clock phase signal and a second clock phase signal.

18. The method as claimed in claim 11, the control settings comprising output digital control words.

19. The method as claimed in claim 11, the divided version of the output voltage generated by a resistive voltage divider.

20. The method as claimed in claim 11, the gain setting comprising a multi-bit gain setting.

* * * * *